May 9, 1961 A. J. STEINTHAL 2,983,470
FLAME AND ABRASION RESISTANT RISER FOR PARACHUTE
Filed April 11, 1958
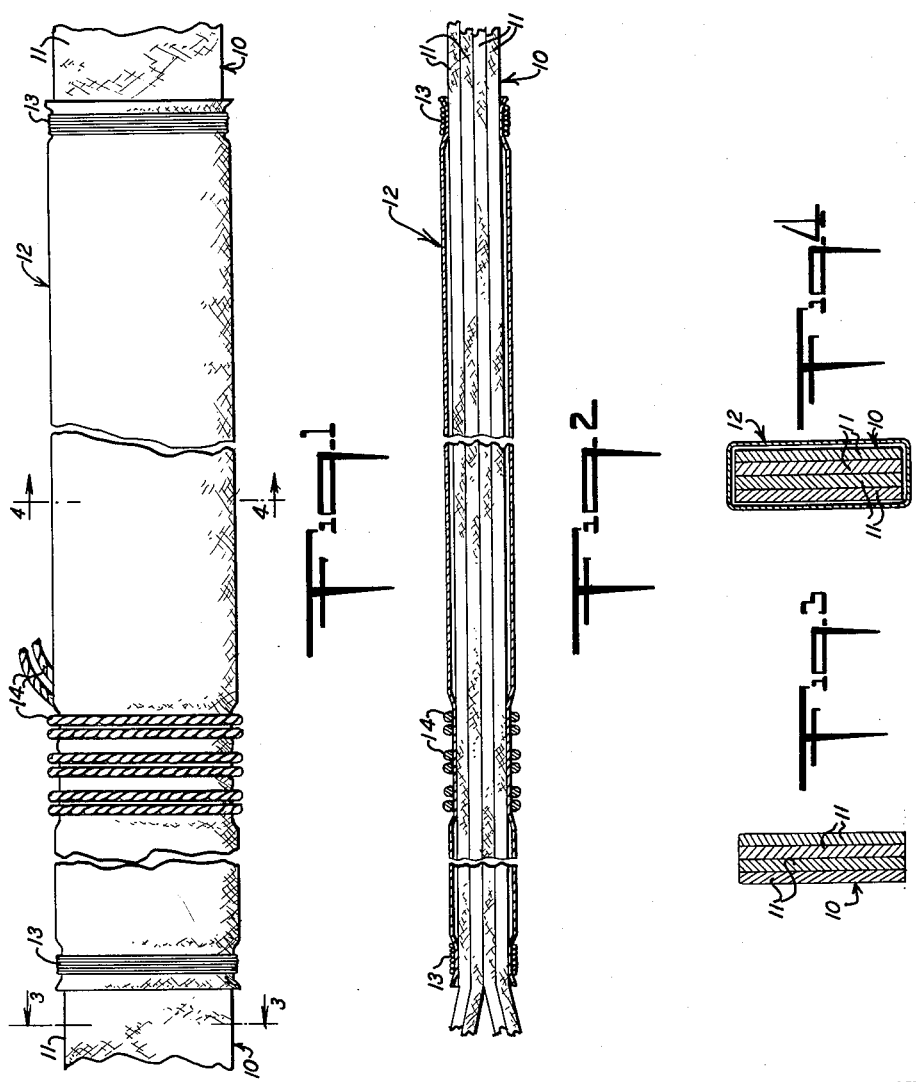
INVENTOR
AUGUSTUS J. STEINTHAL
BY
ATTORNEYS

United States Patent Office 2,983,470
Patented May 9, 1961

2,983,470

FLAME AND ABRASION RESISTANT RISER FOR PARACHUTE

Augustus John Steinthal, Harrison, N.Y., assignor to M. Steinthal & Co., Inc., New York, N.Y., a corporation of New York Filed Apr. 11, 1958, Ser. No. 727,877

5 Claims. (Cl. 244—113)

This invention relates to aeronautics and more particularly to a flame and abrasion resistant riser for connecting a decelerating parachute to an aircraft of the jet propelled type and in the riser is protected from damage due to exposure to the flame and hot gases emanating from the tail pipe of the aircraft.

As is well known, it is now common practice to utilize parachutes for decelerating or reducing the speed of aircraft, particularly of the jet propelled type, during landing operations and since, such decelerating parachutes are attached to the rear of the aircraft, the riser extending between the aircraft and the parachute is frequently exposed to the flames and hot gases emanating from the tail pipe of the jet engine. As a result, ordinary risers constructed of fabric webbing cannot be employed, since the same are damaged to such an extent by the flames and hot gases as to render the same unusable. In an attempt to overcome this difficulty, it has heretofore been proposed to utilize a length of steel cable as a riser, but this has not resulted in a satisfactory solution to the problem, since such cable is relatively stiff and has consequently, interfered with the normal deployment of the parachute and pilot chute and furthermore, such steel cable frequently became entangled in the canopy and shroud lines of the parachute resulting in damage thereto and difficulty in retrieving and repacking the same. Furthermore, after a relatively short period of use, portions of the steel cable would break resulting in lengths of fine wire projecting therefrom which resulted in further damage to the parachute and frequently in injury to personnel handling the same.

In addition to the damage to the riser resulting from exposure to the flames and hot gases, emanating from the jet engine tail pipe, risers are also subjected to undue wear due to contact with the ground or paved runways and consequently, the life of such risers has been relatively short.

It is accordingly an object of the invention to provide a flame and abrasion resistant riser for connecting a decelerating parachute to an aircraft which may be conveniently and economically manufactured from readily available materials and which will substantially prevent damage or undue wear due to exposure to the flames and hot gases emanating from the jet engine tail pipe and also will substantially eliminate damage resulting from abrasion due to contact of the riser with the ground or paved runway.

A further object of the invention is the provision of a flame and abrasion resistant riser for connecting a decelerating parachute to an aircraft in which the relatively great flexibility of a fabric or non-metallic riser is retained and in which the provision of flame and abrasion resistant properties introduces no hazards to the proper deployment of the parachute or results in damage thereto.

A still further object of the invention is the provision of a flame and abrasion resistant riser for connecting a decelerating parachute to an aircraft, which riser will in no way interfere with the normal retrieving and packing of such parachute after completion of a landing operation.

Another object of the invention is the provision of a riser for connecting a decelerating parachute to an aircraft and in which means is provided for materially increasing the life of such riser when compared to risers now in use.

Further objects and advantages of the invention will be apparent from the following description taken in conjunction with the accompanying drawing wherein:

Fig. 1 is a fragmentary elevational view of a riser constructed in accordance with this invention and incorporating flame and abrasion resistant means for protecting the riser;

Fig. 2 a view partly in section taken longitudinally of Fig. 1 and partly in plan view;

Fig. 3 a transverse sectional view taken substantially on the line 3—3 of Fig. 1; and Fig. 4 a transverse sectional view taken substantially on the line 4—4 of Fig. 1.

With continued reference to the drawing, there is shown a parachute riser 10 which is utilized to connect a decelerating parachute to an aircraft and aside from the flame and abrasion resistant characteristics and means to be presently described, such riser may be of more or less conventional construction. As shown in the drawing, the riser 10 of this invention may well comprise a plurality of elongated super-imposed fabric straps 11 of nylon or other suitable webbing, and such straps may be provided at the opposite ends thereof with suitable means for attaching the same to the shroud lines of the parachute and to the aircraft. The specific attaching means and the specific structure of the riser at the opposite ends thereof is not shown or described, since the same forms no part of this invention and it is not believed that a showing or description thereof is necessary or desirable. As shown, the straps 11 are in contact with each other, but if desired, the same may be spaced in any desired manner and while four straps have been shown, it is to be understood that this is for illustrative purposes only and that any number of straps necessary to carry the required load may be employed.

A sleeve 12 of flame resistant material, such as woven fiberglass or woven asbestos is disposed over a major portion of the length of the straps 11 and such sleeve 12 would be so disposed as to cover all portions of the straps 11 which would normally be subjected to the flames and hot gases emanating from the tail pipe of the jet engine and also would cover the portion of the straps 11 which would normally contact the ground when the parachute was released from the aircraft upon completion of a landing operation. The material of which the sleeve 12 is constructed, such as fiberglass or asbestos, will, of course provide all necessary protection against damage to the straps 11 due to exposure to the hot gases and flames and in order to further protect the straps 11, against abrasive wear upon contact with the ground or paved runway, the sleeve 12 may be coated with neoprene or other suitable abrasion resistant material to the necessary thickness to provide the proper protection against undue abrasive wear.

Since the elasticity of the straps 11 and the sleeve 12 will be quite different due to the use of different materials and further in view of the fact, that the straps 11 forming the riser 10 stretch to an appreciable extent, particularly as a result of the initial impact caused by opening of the parachute canopy, the sleeve 12 is secured to the straps 11 in such a manner as to permit relative movement between the straps 11 and the sleeve 12, but at the same time, to substantially maintain the location of the sleeve 12 on the straps 11. For this purpose, the opposite ends of the sleeve 12 are tightly wrapped with a suitable thread or cord 13 which serves to frictionally bind or secure the ends of the sleeve 12 to the straps 11 and this will serve to maintain the relative position of the sleeve 12 on the straps 11, but will at the same time, permit limited relative sliding movement therebetween, as described above.

If desired, a lanyard 14 may have one end thereof wrapped about the sleeve 12, as clearly shown in Figs. 1 and 2, and may be secured thereto in any desired manner and the lanyard 14 is utilized upon deployment of the parachute to assist in opening the deployment bag during such operation. The lanyard 14 and its attachment to the sleeve 12, however, forms no part of the instant invention, since such lanyards are frequently employed with conventional risers utilized for connecting decelerating parachutes to aircraft.

While the above described structure is relatively simple, it will be obvious that the same provides adequate protection against damage to the riser, due to exposure to flame and hot gases and also due to abrasion caused by contact with the ground or paved runways and furthermore, the flame and abrasion protective means may be utilized in connection with conventional riser structures without necessitating modification thereof and it has been found that the use of the flame and abrasion protective means of this invention has resulted in a material increase in life of risers utilized for the purpose described above.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. For use in connecting a decelerating parachute to an aircraft a flame and abrasion resistant riser comprising a plurality of elongated super-imposed fabric straps, a sleeve of woven flame resistant material enclosing said straps for a major portion of the length thereof, a coating of abrasion resistant material on said sleeve and means for frictionally securing the opposite ends of said sleeve to said straps to hold said sleeve in place, but permitting relative movement between said straps and sleeve to compensate for differences in elasticity of the materials.

2. A riser as defined in claim 1 in which said sleeve comprises woven fiberglass.

3. A riser as defined in claim 1 in which said sleeve comprises woven asbestos.

4. A riser as defined in claim 1 in which said coating comprises neoprene.

5. For use in connecting a decelerating parachute to an aircraft a flame and abrasion resistant riser comprising a plurality of elongated super-imposed straps, a sleeve of flame and abrasion resistant material enclosing said straps for a major portion of the length thereof, and means for frictionally securing the opposite ends of said sleeve to said straps to hold said sleeve in place but permitting relative movement between said straps and sleeve to compensate for differences in the elasticity of the materials.

References Cited in the file of this patent

UNITED STATES PATENTS

| 1,019,858 | Tanner | Mar. 12, 1912 |
| 2,258,745 | Dewey et al. | Oct. 14, 1941 |
| 2,383,733 | Parker | Aug. 28, 1945 |
| 2,754,848 | Knowland et al. | July 17, 1956 |
| 2,829,849 | Plath | Apr. 8, 1958 |
| 2,833,313 | Penman | May 6, 1958 |

FOREIGN PATENTS

| 1,077,922 | France | May 5, 1954 |